United States Patent
Pfalzgraf et al.

(10) Patent No.: US 6,412,858 B2
(45) Date of Patent: Jul. 2, 2002

(54) MOTOR VEHICLE ROOF WITH VENTILATOR MEANS

(75) Inventors: Manfred Pfalzgraf, Herrsching; Walter Schatzler, Starnberg, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/813,349

(22) Filed: Mar. 21, 2001

(30) Foreign Application Priority Data

Mar. 21, 2000 (DE) .......................... 100 13 720

(51) Int. Cl.[7] ................ B60J 7/22; B60H 1/24
(52) U.S. Cl. .................. 296/217; 296/208; 454/136
(58) Field of Search ...................... 296/217, 208; 454/129, 136

(56) References Cited

U.S. PATENT DOCUMENTS 2,087,651 A * 7/1937 Mygland ................ 296/208 X
5,031,959 A * 7/1991 Queveau ................ 296/217 X

FOREIGN PATENT DOCUMENTS

| DE | 4034851 | * | 5/1992 | ................ 296/217 |
| EP | 0 362 028 B1 | | 4/1990 | |
| IT | 533581 | * | 5/1958 | ............ 296/216.02 |
| JP | 44386 | * | 2/1989 | ................ 296/215 |
| JP | 82628 | * | 4/1991 | ................ 296/217 |

* cited by examiner

Primary Examiner—Dennis H. Pedder
(74) Attorney, Agent, or Firm—Nixon Peabody LLP; David S. Safran

(57) ABSTRACT

A motor vehicle roof with a transparent roof section and at least one ventilator which borders the roof section for clearance of a ventilator opening, a front and/or rear transverse body member of the vehicle roof which borders the transparent roof section containing the at least one ventilator. The transparent roof section is a cover which is attached to the transverse roof members and is preferably a glass cover.

8 Claims, 3 Drawing Sheets

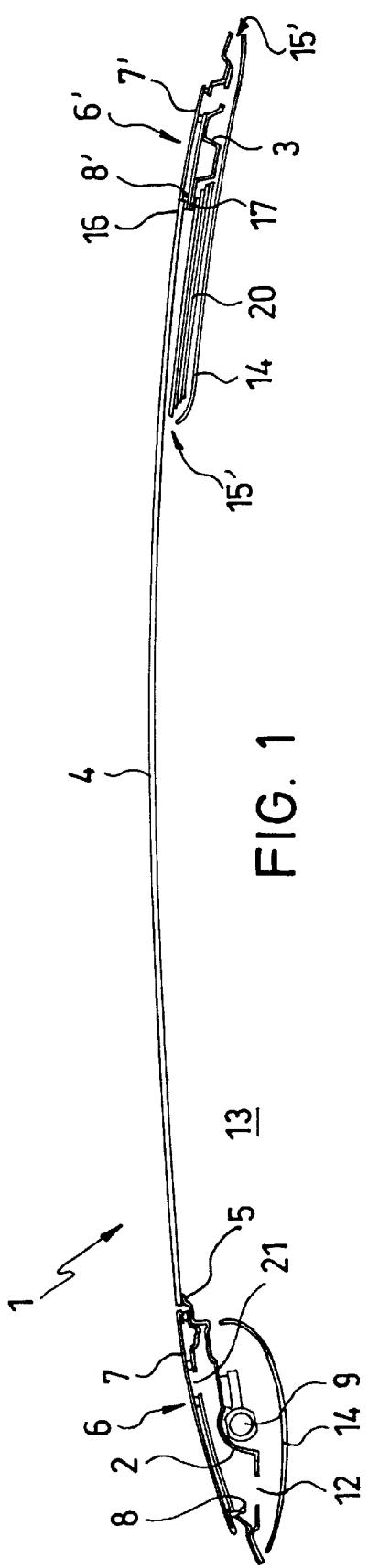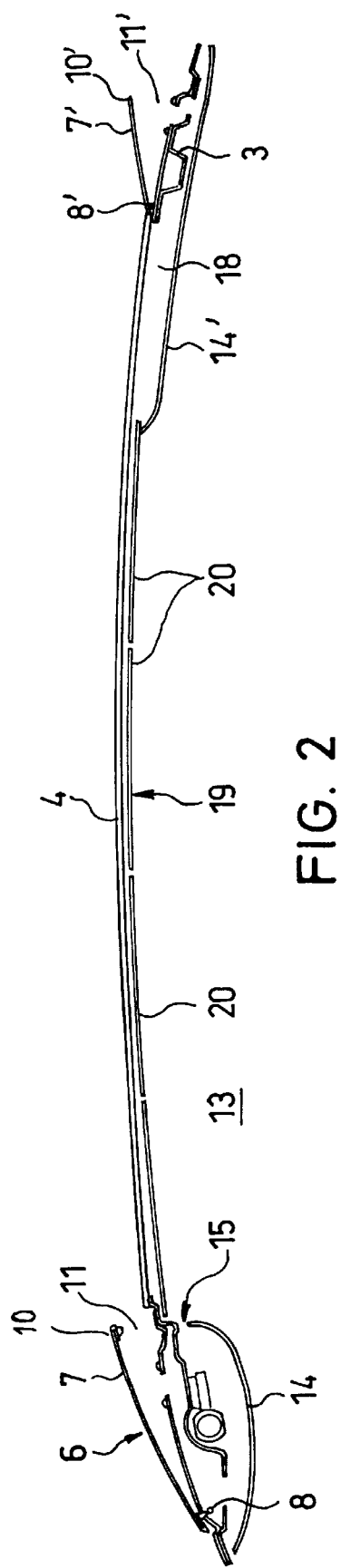

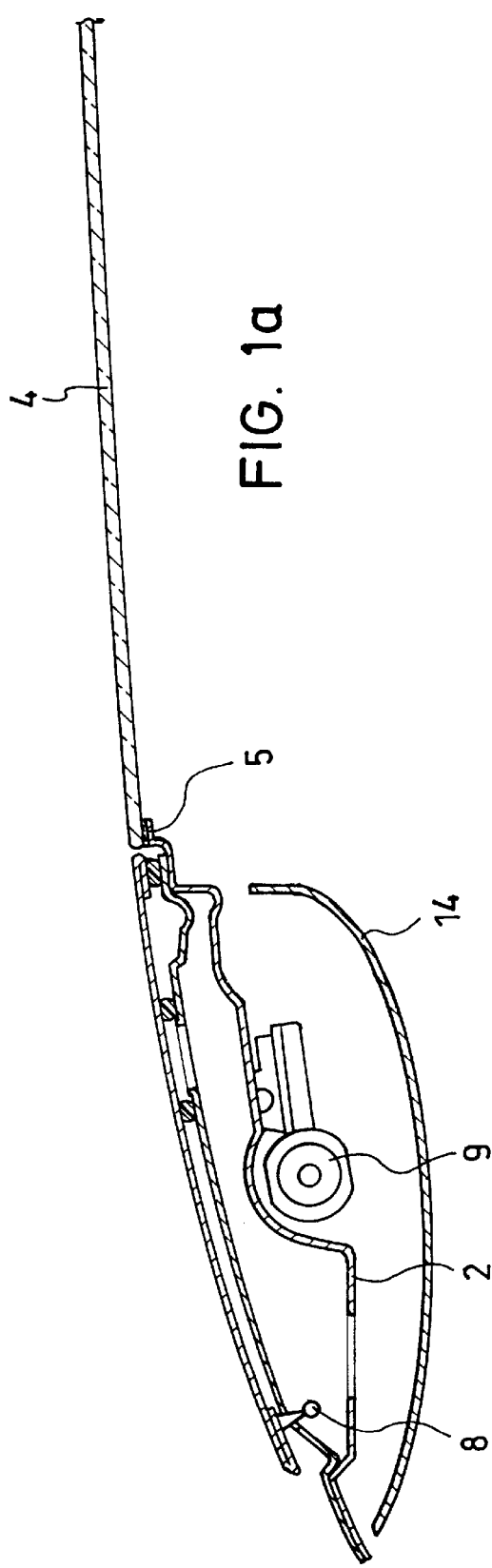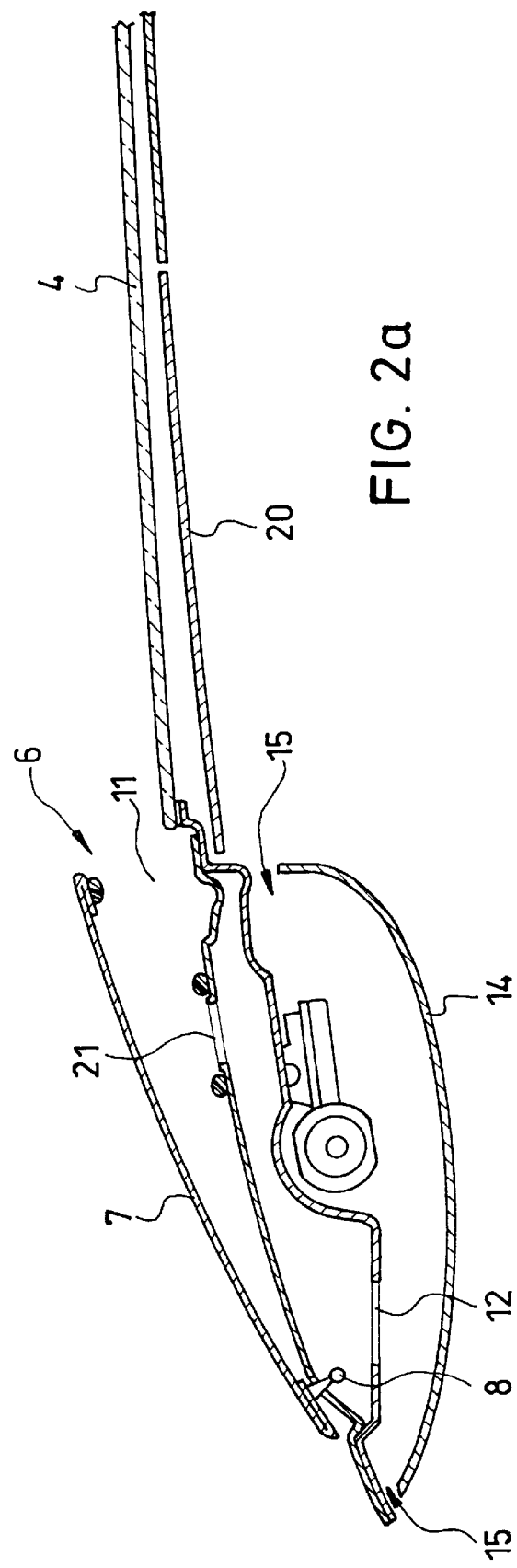

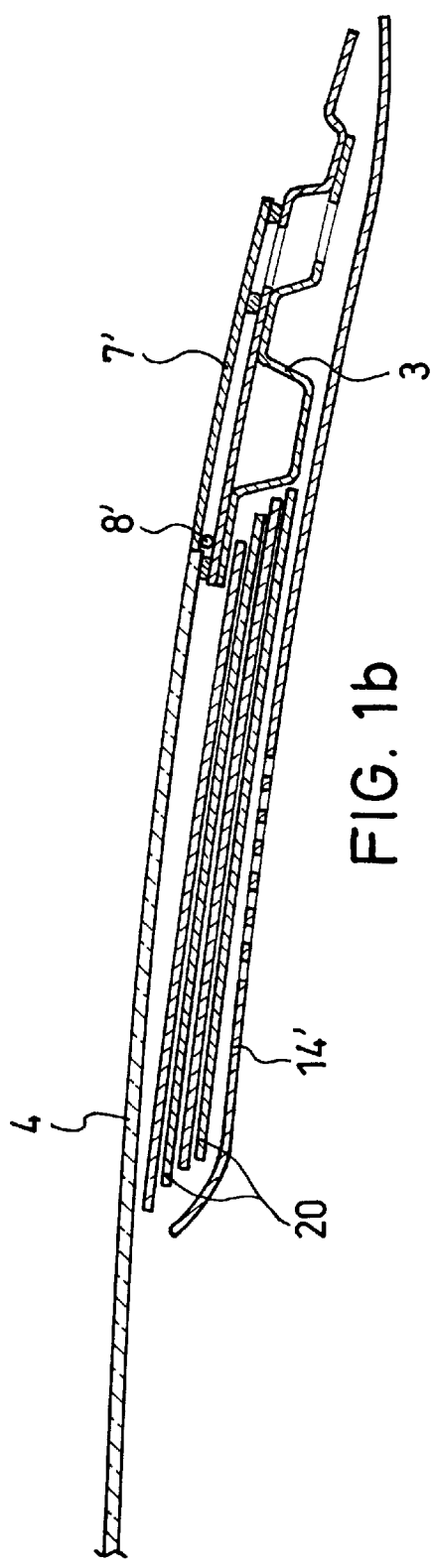
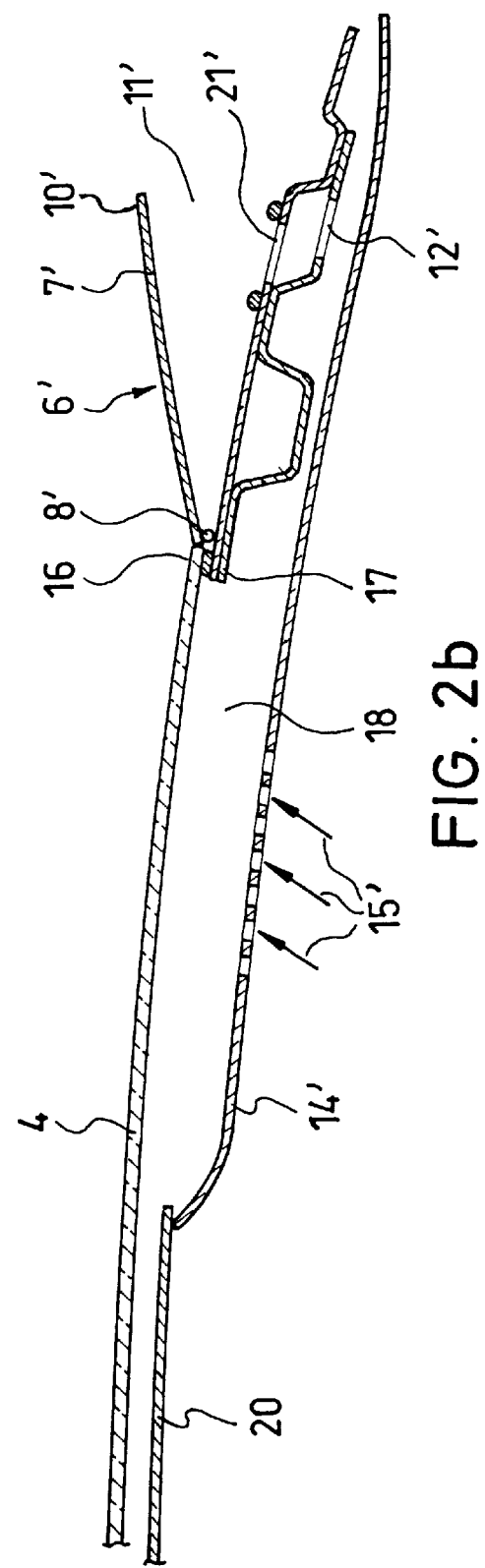

MOTOR VEHICLE ROOF WITH VENTILATOR MEANS

BACKGROUND OF THE INVENTION

1. Field of the Invention

The invention relates to a motor vehicle roof with a transparent roof section and at least one ventilator means which borders the roof section for clearance of a ventilator opening.

2. Description of Related Art

Published European Patent Application EP 0 362 028 B1 discloses a motor vehicle roof with a roof cutout into which a frame is inserted on which the front ventilator flap and the rear ventilator flap are pivotally mounted. Between the two ventilator flaps, a cover, for example, a glass cover, is movably mounted to pivot on the frame. In addition, another rear fixed or removable cover is attachable to the frame between the front cover and the rear ventilator flap. The front and the rear ventilator flaps are coupled to one another by an actuating means with an electric motor and with two sheathed cables. The two sheathed cables each drive one of two movable actuating carriages which are located on each side of each ventilator flap and control the raising motion of the ventilator flaps which are pre-tensioned by springs in the raising direction via crank guides. When the cables are displaced from the closed position in one direction in a sequence of motions, the rear ventilator flap is opened. Then, the front ventilator flap is opened with simultaneous closing of the rear ventilator flap, and finally again, the front ventilator flap is opened jointly with the still open rear ventilator flap. When the cables are moved from the closed position in the opposite direction, the actuation carriages break contact with the crank guides so that they are righted by spring force. Then, the actuation carriages of the front ventilator flap engage the crank guides of the front raisable cover and raise it.

SUMMARY OF THE INVENTION

The primary object of the present invention is to provide a motor vehicle roof which permits a comfortable, bright motor vehicle interior with. largely reduced draft and noise behavior.

This object is achieved by providing a motor vehicle roof where the ventilator means is contained in a front and/or rear transverse roof member which borders the transparent roof section. With the transverse roof member as the supporting part of the roof, and as a result of the dimensioning of the transverse roof member, the ventilator means and actuation means are interchangable. The bordering transparent roof section is directly connected to the transverse roof member, for example, by cementing, so that the transparent roof section, which is preferably a glass cover, may be installed on the motor vehicle roof without a frame. The glass cover may take up almost all of the motor vehicle roof, and, as a result of the large glass surface, the impression of an open roof can be obtained, yet, draft and air stream noise, which commonly occurs when the sliding roof cover is opened, is eliminated. High ventilation performance results from using only a front or a rear ventilator means. If two ventilator means are used, a ventilation behavior which corresponds to the respective requirements may be individually adjusted for the front seats and the back seats by selectively opening one or both ventilator means.

The ventilator means may contain a raisable ventilator flap which may be swivelled out, for example, around a swiveling axis which is located in the area of the front edge of the ventilator means. The rising rear edge of the ventilator flap then opens the ventilation opening.

For air guidance, it is desirable for the transverse roof member to contain air flow openings which may be covered by the ventilator flap.

For an optically pleasing appearance of the motor vehicle interior, it is advantageous for the transverse roof member to have a lower cover which is then able to be used to establish an air flow path for ventilation of the motor vehicle interior via the ventilator means. It is also advantageous for the covering to have openings or a perforation so that the inside air may flow out over a large area.

Preferably, in the front and/or the rear transverse roof member, there is provided a telescoping headliner for at least partial bottom coverage of the transparent roof section.

For individual adjustment, the front and the rear ventilator means may be actuated independently of one another by a drive means for each ventilator means.

BRIEF DESCRIPTION OF THE DRAWING

FIG. 1 shows a lengthwise section of the motor vehicle roof with the ventilator flaps closed;

FIG. 1a is an enlarged view of the front section of the motor vehicle roof as shown in FIG. 1;

FIG. 1b is an enlarged view of the section of the motor vehicle roof as shown in FIG. 1;

FIG. 2 shows a lengthwise section of the motor vehicle roof of FIG. 1 with the ventilator flaps opened and the headliner closed;

FIG. 2a is an enlarged view of the front section of the motor vehicle roof as shown in FIG. 2; and FIG. 2b is an enlarged view of the rear section of the motor vehicle roof as shown in FIG. 2.

DETAILED DESCRIPTION OF THE INVENTION

The motor vehicle roof 1 of a passenger vehicle contains a front transverse roof member 2 and a rear transverse roof member 3 which extend as reinforcing or bearing parts for support of the motor vehicle roof. Between the two transverse roof members 2, 3 extends a glass cover 4 as a fixed transparent roof section of the motor vehicle roof 1. The glass cover 4 is mounted on its front edge to the edge 5 of the transverse roof member 2, for example, by cementing.

The front transverse roof member 2 contains a ventilator means 6 with a ventilator louver or ventilator flap 7 which is pivotally mounted on the transverse roof member 2 around a pivot axis 8 in the area of the front edge of the ventilator flap 7. By means of an individually actuatable drive means 9 which is attached to the front transverse roof member 2, the ventilator flap 7 may be raised fully or partially into the ventilator positions to form a ventilator opening 11 between the raised rear edge 10 and the front edge of the glass cover 4. The transverse roof member 2 contains over the width of the roof several air flow openings 12 (only one of which can be seen) by which the air from the motor vehicle interior 13 may flow out into the hollow transverse roof member 2, through the air flow openings 21, and then, via the ventilator opening 11, to the top of the roof. The air flow openings 21 may be closed and sealed tight by the ventilator flap 7.

Under the transverse roof member 2 towards the motor vehicle interior 13, a cover 14 is attached which may be made as part of the roof headlining. The cover 14 leaves open flow paths 15 for ventilation of the motor vehicle interior 13. The flow paths 15 are formed, for example, between the cover 14 and the transverse roof member 2. A flow path may also be formed by openings or a perforation in the cover 14.

The glass cover 4 is attached on its rear edge 16 to the edge 17 of the rear transverse roof member 3, for example, by cementing. The rear transverse roof member 3 similarly contains a ventilator means 6' with a ventilator louver or ventilator flap 7" which is pivotally mounted in the area of the front edge of the ventilator means 6' to pivot around the pivot axis 8'. By means of an individually actuatable drive means (similar to 9, not shown) which is attached to the rear transverse roof member 3, the ventilator flap 7' may be raised partially or completely into ventilator positions in which a ventilator opening 11' is formed between the raised rear edge 10' and the transverse roof member 3. The transverse roof member 3 similarly contains over the width of the roof several air flow openings 12' (only one of which is shown) by which air from the motor vehicle interior 13 may flow out into the hollow transverse roof member 3, on through the air flow openings 21', and, via the ventilator opening 11', to the top of the roof. The air flow openings 21' may be closed and sealed tight by the ventilator flap 7'.

The cover 14' is similarly attached under the rear transverse roof member 3, for example, by cementing. The flow paths 15' are formed, for example, between the cover 14' and the transverse roof member 3. The cover 14' may have openings or a perforation. In the receiving space 18 between the glass cover 4 and the cover 14', there is a retractable headliner 19 which may be telescopically deployed from its storage position (FIG. 1) as far as the front transverse member 2, and thus, may completely cover the glass cover 4 on the bottom. The headliner 19 may be made as a shade or from individual louvers 20 which are layered on top of one another in the storage position and may be extended forward via lateral guides to the front transverse roof member 2.

The covers 14, 14' cover the two transverse roof members 2 and 3 and the stored headliner 19 with respect to the motor vehicle interior 13 and ensure draft-free ventilation by the configuration of the flow paths 15 and 15'.

What is claimed is:

1. A motor vehicle roof comprising:

a transparent roof section;

front and rear transverse roof body members bordering the transparent roof section;

at least one ventilator incorporated into at least one of said front and rear transverse roof body members and having a flap which borders the transparent roof section and is pivotable for exposing of a ventilator opening through said at least one of said front and rear transverse body members by an independent drive located therein.

2. The motor vehicle roof of claim 1, wherein the transparent roof section is a glass cover which is attached to the at least one transverse roof member.

3. The motor vehicle roof of claim 1, wherein a pivot axis of the ventilator flap is located in an area of a front edge of the ventilator.

4. The motor vehicle roof of claim 3, wherein the at least one transverse roof member contains air flow openings which are covered by the ventilator flap in a closed position thereof 5. The motor vehicle roof of claim 1, wherein the at least one transverse roof member has a lower cover which establishes an air flow path for ventilation of the motor vehicle interior via the at least one ventilator.

6. The motor vehicle roof of claim 5, wherein the lower cover has openings or perforations for establishing said air flow path.

7. The motor vehicle roof of claim 1, wherein further comprising a telescoping headliner in the at least one transverse roof member for at least partial bottom coverage of the transparent roof section.

8. The motor vehicle roof of claim 1, wherein the at least one ventilator comprises a front ventilator and a rear ventilator which are independently actuatable by a respective drive.

* * * * *